United States Patent
Peng et al.

(10) Patent No.: US 11,115,779 B1
(45) Date of Patent: Sep. 7, 2021

(54) SWITCH CONTROLLING SYSTEM AND SWITCH CONTROLLING METHOD OF SMART APPLIANCES

(71) Applicant: GOOD WAY TECHNOLOGY CO., LTD., New Taipei (TW)

(72) Inventors: Tsu-I Peng, New Taipei (TW); Kai-Chung Chu, New Taipei (TW); Chin-Tun Lin, New Taipei (TW)

(73) Assignee: GOOD WAY TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 16/911,751

(22) Filed: Jun. 25, 2020

(51) Int. Cl.
*H04W 4/70* (2018.01)
*H05B 47/13* (2020.01)
*H04W 4/02* (2018.01)
*H04W 4/029* (2018.01)

(52) U.S. Cl.
CPC .......... *H04W 4/023* (2013.01); *H04W 4/025* (2013.01); *H04W 4/029* (2018.02); *H04W 4/70* (2018.02); *H05B 47/13* (2020.01)

(58) Field of Classification Search
CPC ..... H04W 4/023; H04W 4/025; H04W 4/029; H04W 4/70; H05B 47/13
USPC ..................................................... 455/456.1
See application file for complete search history.

(56) References Cited

U.S. PATENT DOCUMENTS

| 2006/0125693 A1 | 6/2006 | Recker |
| 2016/0142891 A1* | 5/2016 | Virhia .................... G06Q 10/00 340/870.07 |
| 2017/0371322 A1* | 12/2017 | Lake ........................ G01S 5/00 |

FOREIGN PATENT DOCUMENTS

| CN | 105388447 A | 3/2016 |
| EP | 3461067 A1 | 3/2019 |

* cited by examiner

*Primary Examiner* — Ted M Wang
(74) *Attorney, Agent, or Firm* — Li & Cai Intellectual Property (USA) Office

(57) ABSTRACT

A switch controlling system and method of smart appliances are provided. A beacon device is movably located in a space and outputs a beacon signal. Switch devices are located respectively at different positions in the space. The switch device entering within a distance range from the beacon device receives the beacon signal from the beacon device and outputs a distance determined signal according to the beacon signal. A central control device obtains spatial information of the space to establish a spatial database. The central control device looks up the spatial information from the spatial database according to the distance determined signal. The central control device determines a position of the beacon device relative to the electronic devices in the space according to the spatial information. The central control device selectively switches the switch devices to control the electronic devices based on the position of the beacon device.

9 Claims, 5 Drawing Sheets

SWITCH CONTROLLING SYSTEM AND SWITCH CONTROLLING METHOD OF SMART APPLIANCES

FIELD OF THE DISCLOSURE

The present disclosure relates to a switch control technology of smart appliances, and more particularly to a switch controlling system and method of smart appliances.

BACKGROUND OF THE DISCLOSURE

Existing electronic appliances must meet the needs of convenience, energy conservation, and carbon emissions reduction. The existing electronic appliances such as lights are automatically turned on or off according to detections of an occupancy sensor. For example, the occupancy sensor is an infrared sensor. When the infrared sensor detects a presence of a human body, the light is triggered to be turned on or off. Alternatively, the light is turned on or off at a preset time. However, a plurality of occupancy sensors are generally required to be linked to each other and configured to sequentially operate for detection, and the lights cannot be instantly operational when set with a preset time.

SUMMARY OF THE DISCLOSURE

In response to the above-referenced technical inadequacies, the present disclosure provides a switch controlling system of smart appliances. The switch controlling system includes a beacon device, a plurality of switch devices and a central control device. The beacon device is movably located in a space and configured to output a beacon signal. The switch devices are disposed respectively at different positions in the space. Each switch device is connected to a plurality of electronic devices disposed in the space. The switch device entering within a distance range from the beacon device is wirelessly connected to the beacon device, receives the beacon signal from the beacon device, and outputs a distance determination signal according to the beacon signal. The central control device is connected to the switch devices. The central control device is configured to obtain spatial information of the space to establish a spatial database. The central control device is configured to look up the spatial information from the spatial database according to the distance determined signal. The central control device is configured to determine a position of the beacon device relative to the electronic devices in the space according to the spatial information, and selectively switch the switch devices to control the electronic devices based on the position.

In certain embodiments, after the beacon device moves from a first region to a second region in the space, the central control device switches the switch device to turn off the electronic device in the first region.

In certain embodiments, the central control device is configured to switch each switch device according to present time information and preset switching time information.

In certain embodiments, the beacon device is connected to the central control device and transmits a voice signal for instructing the central control device to switch one or more of the plurality of switch devices.

In certain embodiments, the central control device is integrated with the switch device.

In addition, the present disclosure provides a switch controlling method of smart appliances. The switch controlling method includes the following steps: disposing a plurality of switch devices respectively at different positions in a space, and connecting each of the switch devices to a plurality of electronic devices disposed in the space; obtaining spatial information of the space to establish a spatial database by a central control device; holding a beacon device and movably locating in the space; outputting a beacon signal by the beacon device; wirelessly connecting the switch device entering within a distance range from the beacon device with the beacon device, receiving the beacon signal from the beacon device by the switch device, and outputting a distance determined signal according to the beacon signal by the switch device; connecting a central control device to the switch device to obtain the distance determination signal; looking up the spatial information from the spatial database based on the distance determined signal, determining a position of the beacon device relative to the electronic devices in the space according to the spatial information, and selectively switching the switch devices based on the position to control the electronic devices, by the central control device.

In certain embodiments, the switch controlling method further includes the following step: switching the switch device to turn off the electronic device in a first region of the space when determining that the beacon device moves from the first region to a second region in the space, by the central control device.

In certain embodiments, the switch controlling method further includes the following step: switching each switch device according to present time information and preset switching time information by the central control device.

In certain embodiments, the switch controlling method further includes the following step: transmitting a voice signal for instructing the central control device to switch one or more of the plurality of switch devices by the beacon device.

As described above, the present disclosure provides the switch controlling system and method of the smart appliances. When the user holds the beacon device in the space, the switch device receives the beacon signal from the beacon device. The beacon signal received by the switch device changes according to a movement of the user. The switch device outputs the distance determined signal according to the beacon signal. The central control device obtains the spatial information according to the distance determined signal, and switches the switch devices to precisely control the electronic devices according to the spatial information. Furthermore, the switch controlling system can track the position of the beacon device and accordingly determines the position of the object onto which the beacon device is attached.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
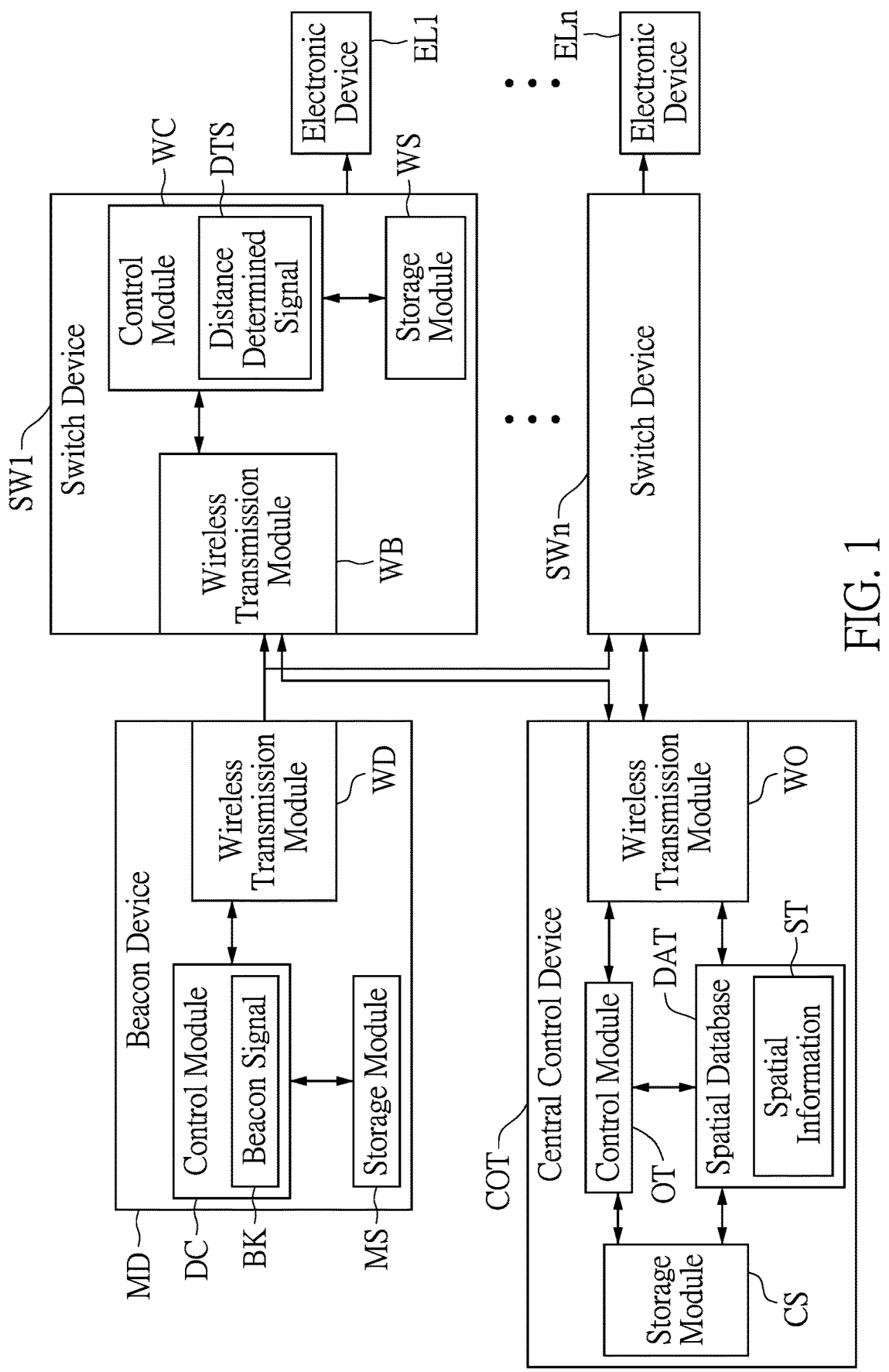
FIG. 1 is a block diagram of a switch controlling system of smart appliances according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Reference is made to FIG. 1, which is a block diagram of a switch controlling system of smart appliances according to a first embodiment of the present disclosure. As shown in FIG. 1, in the embodiment, the switch controlling system includes a beacon device MD, a plurality of switch devices SW1 to SWn and a central control device COT.

The number of the switch devices SW1 to SWn and a plurality of electronic devices EL1 to ELn in a space such as a house may be determined according to actual requirements. The switch devices SW1 to SWn and the electronic devices EL1 to ELn are disposed at same or different positions in the space, wherein n represents the number of the switch devices and the electronic devices and may be any appropriate integer value determined according to actual requirements. The electronic devices EL1 to ELn may be various electronic appliances such as home electronic appliances.

In the embodiment, the switch devices SW1 to SWn are respectively connected to the electronic devices EL1 to ELn and respectively control the electronic devices EL1 to ELn. That is, each one of the switch devices SW1 to SWn controls one of the electronic devices EL1 to ELn. For example, the switch device SW1 controls the electronic device EL1, the switch device SW2 controls the electronic device EL2, and so on, but the present disclosure is not limited thereto. In practice, each one of the switch devices SW1 to SWn may control more than one electronic device, as described in the second embodiment.

The central control device COT is connected to the switch devices SW1 to SWn. The central control device COT is configured to obtain spatial information ST of the space to establish a spatial database DAT. The spatial information ST recorded by the spatial database DAT may include a total area of the space, an area of each of regions divided from the space, and the information of the electronic devices EL1 to ELn, the switch devices SW1 to SWn and other objects in each region. For example, the space may include indoor space including a living room region and a bedroom region, and outdoor space including a balcony, a garden and a region under an eave, but the present disclosure is not limited thereto.

The spatial information ST recorded by the spatial database DAT may further include the position of each of the electronic devices EL1 to ELn in the space, the information that each of the electronic devices EL1 to ELn is disposed in which one of the regions, relative positions between the electronic devices EL1 to ELn, relative positions and distances between the electronic devices EL1 to ELn and the switch devices SW1 to SWn, relative positions between the electronic devices EL1 to ELn and objects that are not electronic devices (for example, the object is a door of the house), and the information that each of the electronic devices EL1 to ELn is controlled by which one of the switch devices SW1 to SWn, but the present disclosure is not limited thereto. It should be understood that, after a user removes old or places new furniture, accessories and home electronic appliances in the space, the central control device COT may obtain the updated spatial information ST.

The user may hold the beacon device MD and enter a space. For example, the beacon device MD is a mobile device or a wearable device, but the present disclosure is not limited thereto. The user may move between different positions in a plurality of regions divided by the space and stay at any of the positions for a period of time, according to personal preferences and requirements of the user.

The beacon device MD may include a wireless transmission module WD, a control module DC and a storage module MS. The control module DC is connected to the wireless transmission module WD and the storage module MS. In the embodiment, the wireless transmission module WD uses a Bluetooth® transmission technology, but the present disclosure is not limited thereto. In practice, the wireless transmission module WD may use other types of wireless transmission technology such as Wi-Fi, according to application requirements.

The control module DC of the beacon device MD may generate a beacon signal BK. If necessary, the beacon signal BK may be stored in the storage module MS. When the user holds the beacon device MD and enters the space, the wireless transmission module WD of the beacon device MD may output the beacon signal BK.

The switch device SW1 may include a wireless transmission module WB, a control module WC and a storage module WS. The control module WC is connected to the wireless transmission module WB and the storage module WS. The configurations and the operations of circuit components of each of the switch devices SW2 to SWn are the same as that of the switch device SW1. For the sake of simplicity and clarity, only the circuit components of the switch device SW1, but not the circuit components of the switch devices SW2 to SWn, are shown in FIG. 1.

The wireless transmission module WB of each of the switch devices SW1 to SWn may continuously detect the beacon signal BK within a distance range from the wireless transmission module WB. When any one or more of the plurality of switch devices SW1 to SWn enters within a distance range from the beacon device MD and is wirelessly connected to the beacon device MD, the one or more switch devices SW1 to SWn detects and receives the beacon signal BK outputted by the beacon device MD, and then generates a distance determined signal DTS according to the beacon signal BK. The distance determined signal DTS may be stored in the storage module WS and transmitted to the central control device COT by the wireless transmission module WB.

The central control device COT may include a control module OT, a wireless transmission module WO, a storage module CS and the spatial database DAT. The control module OT is connected to the wireless transmission module WO and the storage module CS. The wireless transmission module WO of the central control device COT transmits the beacon signal BK from the wireless transmission module WB of the one or more switch devices SW1 to SWn to the control module OT. The beacon signal BK is analyzed by the control module OT and may be stored in the storage module CS. If necessary, the spatial database DAT may also be stored in the storage module CS.

When the switch device SW1 receives the beacon signal BK from the beacon device MD, the control module OT of the central control device COT determines a strength of the distance determined signal DTS. The control module OT calculates a distance between the beacon device MD and the switch device SW1 according to the strength. The larger the distance between the beacon device MD and the switch device SW1 is, the weaker the strength of the distance determined signal DTS is.

The control module OT of the central control device COT looks up the spatial information ST of the position of the switch device SW1 in the space from the spatial database DAT. The control module OT determines the position of the beacon device MD (relative to the switch device SW1) in the space based on the distance between the beacon device MD and the switch device SW1.

Further, the control module OT of the central control device COT looks up the spatial information ST corresponding to the position of the beacon device MD from the spatial database DAT. For example, the control module OT obtains positions of a plurality of electronic devices EL1 to EL3 entering within the distance range from the beacon device MD. Alternatively, the control module OT obtains the position of the electronic device EL2 that is closest to the beacon device MD among the electronic devices EL1 to EL3.

The control module OT of the central control device COT obtains the spatial information ST from the spatial database DAT, based on parameters of the distance determined signal DTS. For example, the parameters of the distance determined signal DTS may include the strength, an angle of arrival (AoA), an angle of departure (AoD), a time of arrival (ToA), a time of flight (ToF), a transmission time between the time of arrival and the time of flight, but present disclosure is not limited thereto. The control module OT determines which one or more of the plurality of electronic devices EL1 to EL3 such as the electronic device EL2 needs to be turned on according to the spatial information ST. The control module OT looks up spatial information ST from the spatial database DAT to find out which one or more of the plurality of switch devices such as the switch device SW2 is used to control the one or more of the plurality of electronic devices EL1 to EL3 that needs to be turned on. Finally, the control module OT of the central control device COT switches the switch device SW2 to control the electronic device EL2. For example, the control module OT switches the switch device SW2 from an off state/position to an on state/position to turn on the electronic device EL2.

Figure 2:
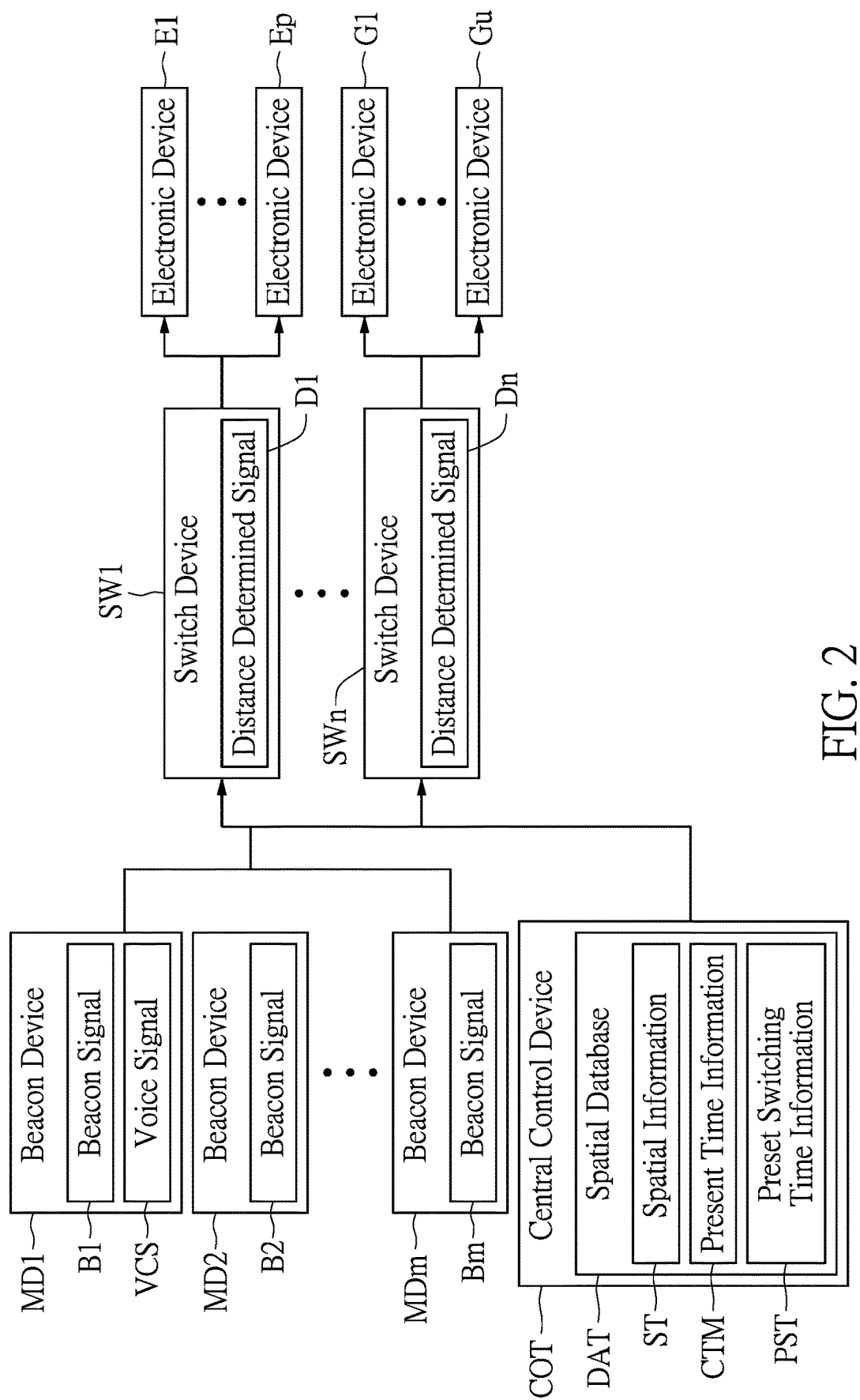
FIG. 2 is a block diagram of a switch controlling system of smart appliances according to a second embodiment of the present disclosure.

Reference is made to FIG. 2, which is a block diagram of a switch controlling system of smart appliances according to a second embodiment of the present disclosure. As shown in FIG. 2, in the embodiment, the switch controlling system includes a plurality of beacon devices MD1 to MDm, the plurality of switch devices SW1 to SWn and the central control device COT, wherein m and n may be any integer values, m represents the number of the beacon devices and n represents the number of the switch devices.

Each of the beacon devices MD1 to MDm in the second embodiment may include modules that are the same as that of the beacon device MD in the first embodiment. Each of the switch devices SW1 to SWn in the second embodiment may include modules that are the same as that of the switch device SW1 in the first embodiment. The central control device COT in the second embodiment may include modules that are the same as that of the central control device COT in the first embodiment. The same descriptions of the first and second embodiments are not repeated herein.

In the first embodiment, each one of the electronic devices EL1 to ELn is turned on or off by one of the switch devices SW1 to SWn. In contrast, in the second embodiment, the switch device SW1 may be connected to a plurality of electronic devices E1 to Ep and configured to turn on or off the plurality of electronic devices E1 to Ep, wherein p may be any suitable integer value and represents the number of the electronic devices controlled by the switch device SW1. In addition, the switch device SWn may be connected to a plurality of electronic devices G1 to Gu and configured to turn on or off the plurality of electronic devices G1 to Gu, wherein u may be any suitable integer value and represents the number of the electronic devices controlled by the switch device SWn. The configuration of each of the switch devices SW2 to SWn−1 is the same as that of the switch device SW1 or SWn.

In addition, in the first embodiment, only the beacon device MD enters the space. In contrast, in the second embodiment, the beacon devices MD1 to MDm enter the space at the same or different time points. The beacon devices MD1 to MDm respectively output beacon signals B1 to Bm.

The switch devices SW1 to SWn entering within distance ranges from the beacon devices MD1 to MDm are wirelessly connected to the beacon devices MD1 to MDm and receive the beacon signals B1 to Bm from the beacon devices MD1 to MDm, by using Bluetooth or other transmission technologies. The switch devices SW1 to SWn output distance determined signals D1 to Dn according to the beacon signals B1 to Bm, respectively.

When the beacon devices MD1 to MDm are disposed at the same position or close to each other at the same time, the same switch device SW1 may receive the beacon signals B1 to Bm respectively from the beacon devices MD1 to MDm. When the switch devices SW1 to SWn are disposed in the same region of the space, the different switch devices SW1 to SWn may receive the beacon signal B1 from the same beacon device MD1.

The central control device COT determines parameters of the distance determined signals D1 to Dn respectively generated by the switch devices SW1 to SWn. For example, the parameters of the distance determined signals D1 to Dn may include the angle of arrival (AoA), the angle of departure (AoD), the time of arrival (ToA), the time of flight (ToF), the transmission time between the time of arrival and the time of flight, the strength, and a distance between each of the beacon devices MD1 to MDm and each of the switch devices SW1 to SWn. The distance may be calculated based on the strength of the distance determined signals D1 to Dn, but present disclosure is not limited thereto. The central control device COT looks ups the spatial information from the spatial database DAT based on the parameters of the distance determined signals D1 to Dn. The central control device COT determines the positions of the beacon devices MD1 to MDm (relative to the electronic devices E1 to Ep, G1 to Gu, and so on) in the space. The central control device COT selectively switches the switch devices SW1 to SWn to control the electronic devices E1 to Ep, G1 to Gu, and so on according to the positions of the beacon devices MD1 to MDm. The central control device COT only switches some of the switch devices SW1 to SWn. For example, the central control device COT only turns on the switch device SW1 closest to the beacon devices MD1 to MDm among the switch devices SW1 to SWn, or turns on the switch devices SW1 to SW3 in the region where the beacon devices MD1 to MDm are located.

In addition, the central control device COT may obtain present time information CTM and preset switching time information PST. When a present time indicated by the present time information CTM reaches a switching time indicated by the preset switching time information PST, the central control device COT switches the switch devices SW1 to SWn, for example, from an on state to the an off state, or from the off state to the on state. When the central control device COT switches the switch devices SW1 to SWn to the on state from the off state, the electronic devices E1 to Ep, G1 to Gu, and so on are activated by the switch devices SW1 to SWn connecting thereto. Conversely, when the switch devices SW1 to SWn are switched to the off state, the electronic devices E1 to Ep, G1 to Gu, and so on are turned off by the switch devices SW1 to SWn connecting thereto.

Figure 3:
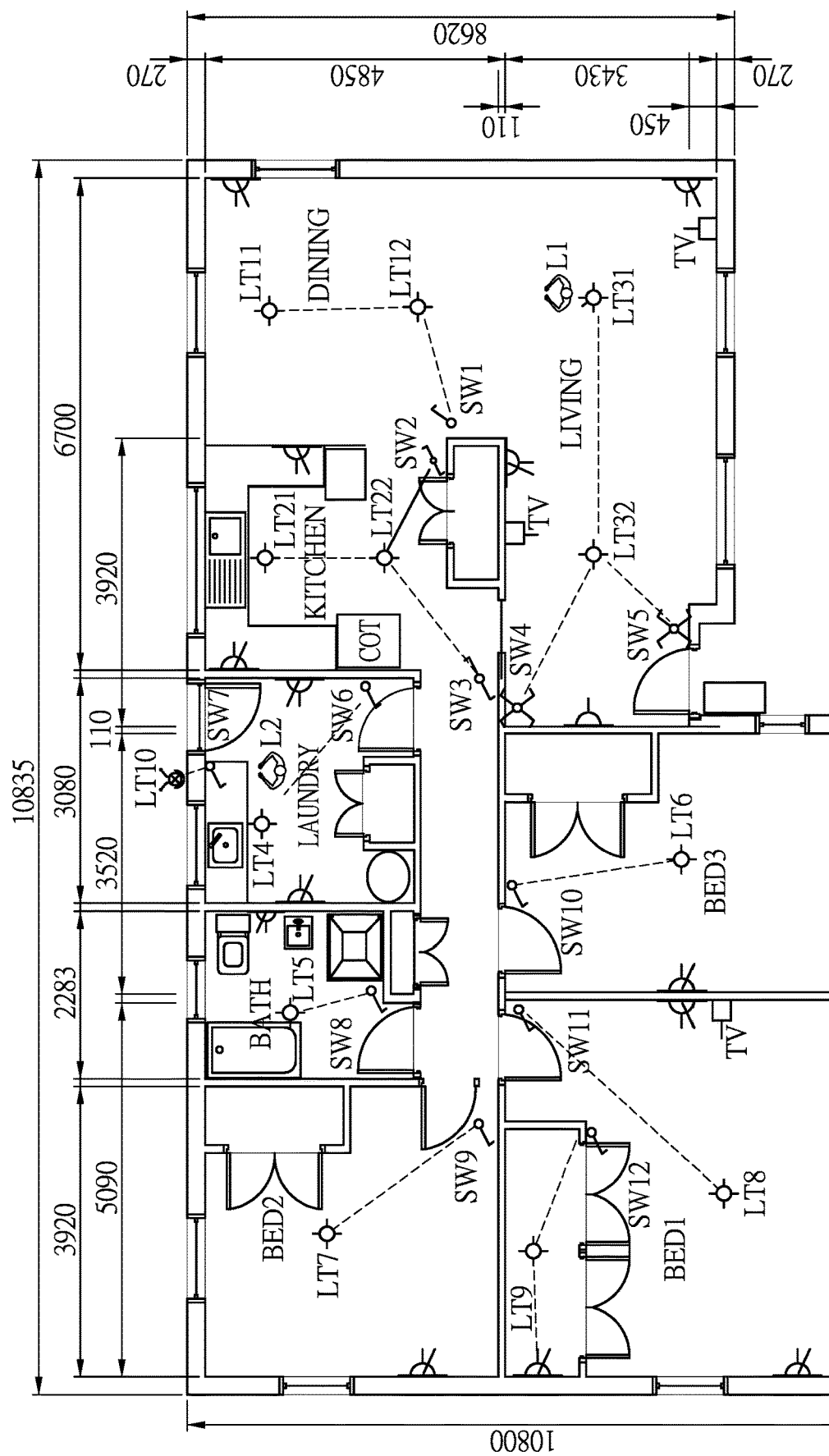
FIG. 3 is a schematic diagram of a switch controlling system for smart appliances in an indoor space and an outdoor space according to a third embodiment of the present disclosure.

Reference is made to FIG. 3, which is a schematic diagram of a switch controlling system for smart appliances in an indoor space and an outdoor space according to a third embodiment of the present disclosure.

As shown in FIG. 3, the indoor space is divided into a plurality of regions such as a dining region DINING, a kitchen region KITCHEN, a living region LIVING, a laundry region LAUNDRY, a bathing region BATH and bedroom regions BED1, BED2 and BED3. The regions may be communicated with each other or be separated from each other by walls and doors.

Lights LT11 and LT12 are disposed in the dining region DINING. Lights LT21 and LT22 are disposed in the kitchen region KITCHEN. Lights LT31 and LT32 are disposed in the living region LIVING. A light LT4 is disposed in the laundry region LAUNDRY. A light LT5 is disposed in the bathing region BATH. A light LT6 is disposed in the bedroom region BED3. A light LT7 is disposed in the bedroom region BED2. Lights LT8 and LT9 are disposed in the bedroom region BED1. In addition, a light LT10 is disposed in the outdoor space. It should be understood that, the lights are exemplified in the embodiments, but the present disclosure is not limited thereto. In practice, the lights may be replaced with other appliances and electronic devices.

In addition, the central control device COT may be disposed in the kitchen region KITCHEN in the indoor space, but the present disclosure is not limited thereto. The switch devices SW1 to SW12 are disposed respectively at the plurality of regions in the indoor space and connected to the central control device COT. The switch device SW1 is connected to the lights LT11 and LT12. The switch devices SW2 and SW3 are connected to the lights LT21 and LT22. The switch devices SW4 and SW5 are connected to the lights LT31 and LT32. The switch device SW6 is connected to the light LT4. The switch device SW7 is connected to the light LT10. The switch device SW8 is connected to the light LT5. The switch device SW9 is connected to the light LT7. The switch device SW10 is connected to the light LT6. The switch device SW11 is connected to the light LT8. The switch device SW12 is connected to the light LT9.

When a user L1 holds a beacon device such as a cell phone and enters the living region LIVING in the indoor space, the beacon device outputs the beacon signal. For example, the switch device SW1 is closest to the beacon device among the switch devices SW1 to SW12. When the switch device SW1 enters within a distance range from the beacon device held by the user L1, the switch device SW1 is wirelessly connected to the beacon device and receives the beacon signal from the beacon device. The switch device SW1 then outputs the distance determined signal to the central control device COT according to the beacon signal.

It is worth noting that, although the switch device SW1 is closest to the user L1, the light LT31 connected to the switch device SW4 but not the lights LT11 and LT12 connected to the switch device SW1 is closest to the user L1 among all the lights LT11, LT12, LT21, LT22, LT31, LT32 and LT4-LT9. Therefore, the central control device COT does not switch the switch device SW1 receiving the beacon signal to control the lights LT11 and LT12 connected to the switch device SW1.

In detail, the central control device COT looks up the spatial information from the spatial database to obtain the position of the switch device SW1 in the indoor space, according to the distance determined signal provided by the switch device SW1. The central control device COT may look up more spatial information of the space to obtain the position of the beacon device in the indoor space, according to the position of the switch device SW1 and the distance between the beacon device and switch device SW1.

For example, the plurality of regions divided by the space may be defined by a checkerboard grid in the spatial database. The spatial database stores a plurality of grid numbers or codes representing a plurality of regions respectively, and a plurality of switch numbers representing the plurality of switch devices SW1 to SWn respectively, and a plurality of electronic device numbers representing the plurality of electronic devices such as the light LT11 respectively. The central control device COT may determine the grid number or code such as G8 representing the region where the beacon device (having a unique identification code) is located, the electronic device number such as LT31 representing the electronic device within the distance range from or closest to the beacon device, and the switch number such as SW4 representing the switch device controlling the electronic device, according to the distance determined signal and the spatial information in the spatial database.

The central control device COT looks up the spatial information of the electronic devices from the spatial database, and determines that the light LT31 is closest to the beacon device among appliances according to the spatial information. Therefore, the central control device COT switches the switch device SW4 to control the light LT31. For example, the central control device COT may switch the switch device SW4 to switch the light LT31 from an off state to an on state. Alternatively, the light LT31 is switched from one lighting mode (for example, only bulbs for emitting yellow light in the light LT31 is turned on) to another lighting mode (for example, only bulbs for emitting white light in the light LT31 are turned on).

When a user L2 holds a beacon device and enters the laundry region LAUNDRY in the indoor space, the switch device SW7 entering within a distance range from the beacon device is wirelessly connected to the beacon device and receives the beacon signal from the beacon device. The switch device SW7 then outputs the distance determined signal according to the beacon signal to the central control device COT.

The central control device COT looks up the spatial information from the spatial database according to the distance determined signal from the switch device SW7. The spatial information includes the position of the switch device SW7 in the space, the position of the beacon device within the distance range from the switch device SW7, and the information of the region close to the beacon device. The central control device COT determines that the beacon device is located in the indoor space, the lights LT4 and LT10 are disposed close to the beacon device or in the region where the beacon device is located, the light LT4 is disposed in the indoor space, and the light LT10 is disposed in the outdoor space, according to the spatial information. In addition, the central control device COT determines a distance between the beacon device and the light LT4, and a distance between the beacon device and the light LT10, according to the spatial information. Accordingly, the central control device COT determines that the user L2 holding the beacon device is located in the indoor space and the light LT4 but not the light LT10 needs to be turned on. Therefore, the central control device COT switches the switch device SW6 to an on state from an off state to turn on the light LT4.

Further, when the user L2 holds the beacon device and moves to a position near the light LT10 during daytime, the central control device COT determines that a current time is daytime according to the present time information, and does not turn on the light LT10 at the current time because the preset switching time information indicates that the light LT10 does not need to be turned on during daytime.

When the user L2 holds the beacon device and moves from a first region such as the laundry region LAUNDRY to a second region such as the bedroom BED2 in the indoor space, the central control device COT switches the switch device SW6 to an off position/state from an on position/state to turn off the light LT4 in the first region. It should be understood that, the first region and the second region used herein are relative terms, and respectively represent the region where the user L2 is previously located (the previous region) and the region where the user L2 is currently located (the next region), instead of specific regions.

Figure 4:
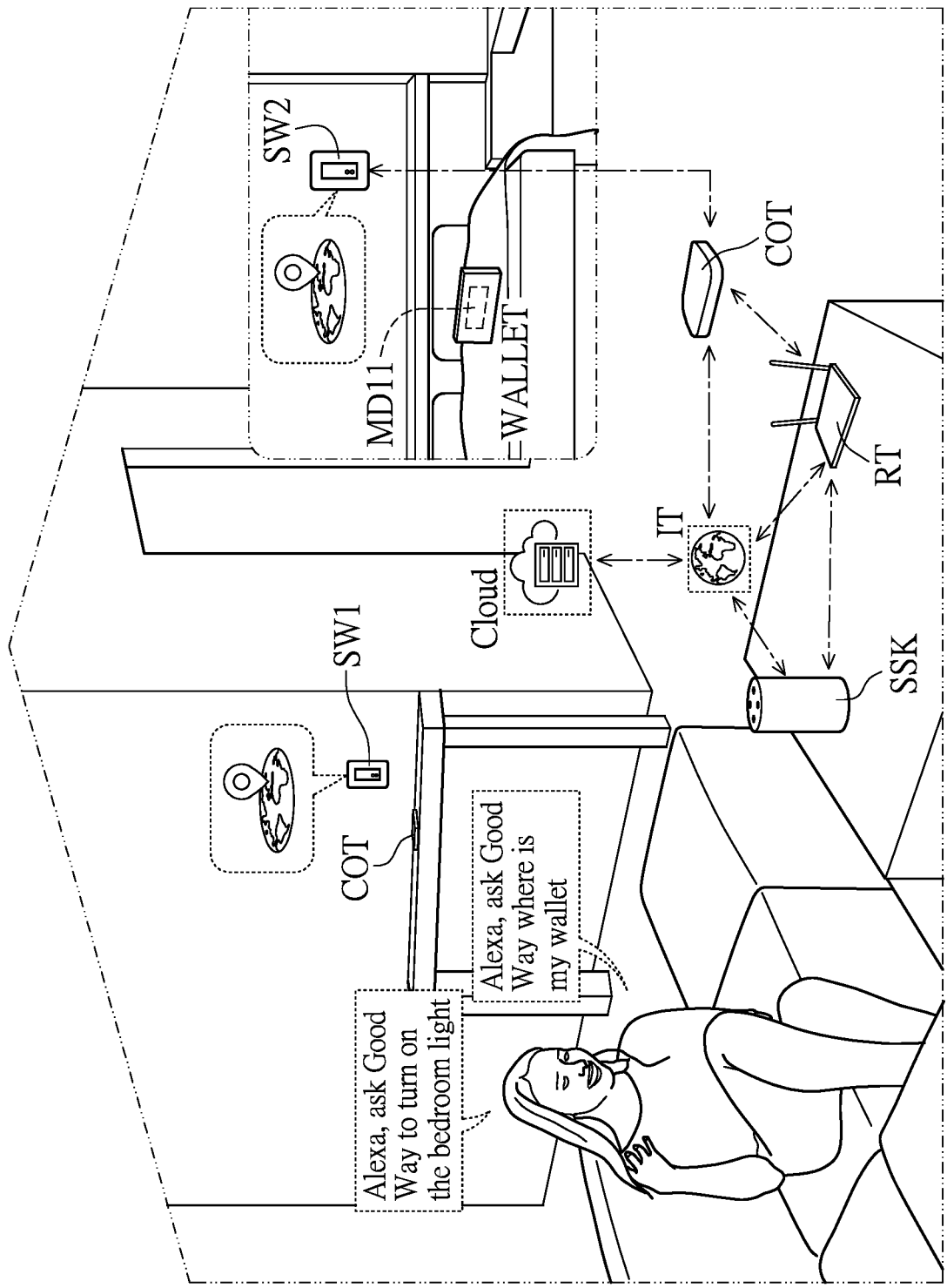
FIG. 4 is a schematic diagram of a switch controlling system of smart appliances according to a fourth embodiment of the present disclosure.

Reference is made to FIG. 4, which is a schematic diagram of a switch controlling system of smart appliances according to a fourth embodiment of the present disclosure. In the embodiment, the switch controlling system includes a beacon device MD11, the switch devices SW1 and SW2 and the central control device COT. The central control device COT may be integrated with one of the switch devices SW1 and SW2 and connected to the switch devices SW1 and SW2.

The central control device COT is connected to the switch device SW1 in a living room and the switch device SW2 in a bedroom. In addition, the central control device COT may be wirelessly connected to a smart player SSK through a router RT and control the switch devices SW1 and SW2 and the smart player SSK. Further, the central control device COT may be connected to a cloud server Cloud through a network IT. The cloud server Cloud may instruct the central control device COT to control the switch devices SW1 and SW2 and the smart player SSK, or transmit operational states of the switch devices SW1 and SW2 and the smart player SSK to the cloud server Cloud.

A user may hold a cell phone or other type of electronic device in practice as the beacon device. An application may be installed in the beacon device. For example, when the user says "Alexa, ask Good Way to turn on the bedroom light" as shown in FIG. 4 to the cell phone, the beacon device outputs a voice signal to the central control device COT according to a content of the voice of the user. The central control device COT switches the switch device SW1 or SW2 to control a light to emit light according to the voice signal. In practice, the smart player SSK may be controlled to play music or perform other operations by a voice of the user.

On the other hand, the user may attach an electronic tag or other type of the beacon device MD11 onto an object such as a wallet WALLET. For example, when the user intends to get the wallet WALLET but forgets where the wallet WALLET is placed, the user may say "Alexa, ask Good Way where is my wallet" as shown in FIG. 4 to the cell phone or other sound receivers as the beacon device. Then, the sound receiver outputs a voice signal to the central control device COT according to the content of the voice of the user. The central control device COT detects the beacon device MD11 to find the position of the wallet WALLET on which the beacon device MD11 is attached, according to the voice signal. The central control device COT provides the position of the wallet WALLET to the cell phone (or other types of mobile device) of the user. The cell phone displays the position of the wallet WALLET.

Figure 5:
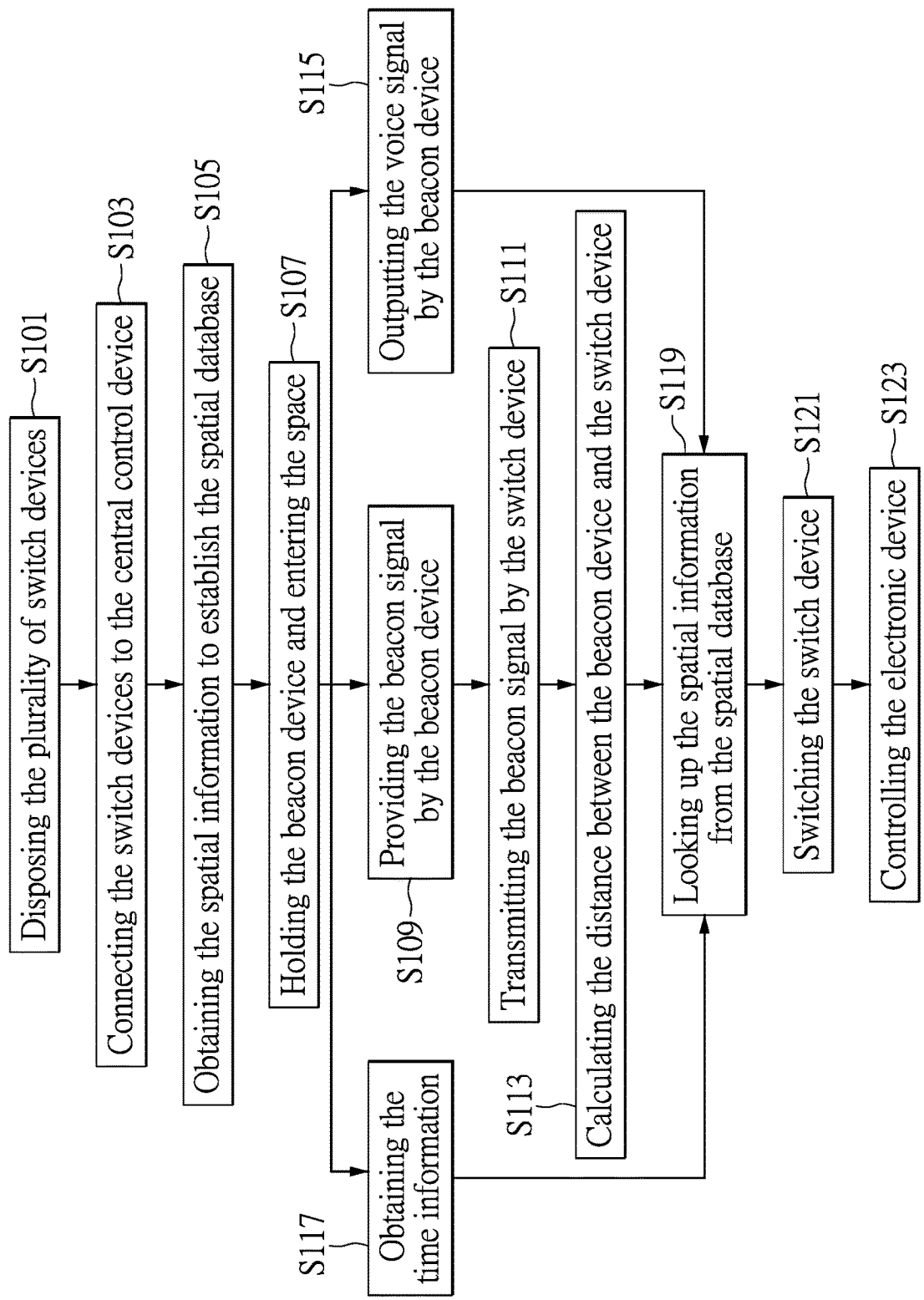
FIG. 5 is a flowchart diagram of a switch controlling method of smart appliances according to a fifth embodiment of the present disclosure.

Reference is made to FIG. 5, which is a flowchart diagram of a switch controlling method of smart appliances according to a fifth embodiment of the present disclosure. As shown in FIG. 5, in the embodiment, the switch controlling method includes the following steps S101 to S123. It should be understood that, the present disclosure is not limited to the examples of the embodiment. In practice, steps may be increased or decreased and an order of the steps may be appropriately adjusted, according to actual application requirements.

In step S101, the plurality of switch devices are disposed respectively at different positions in the space. Each switch device is connected to one or more electronic devices disposed in the space.

In step S103, the switch devices are connected to the central control device.

In step S105, the central control device obtains the spatial information of the space to establish the spatial database.

In step S107, the user holds the beacon device and enters the space. The user may move to and stay at any position in the space.

In step S109, the beacon device outputs the beacon signal.

In step S111, the switch device receives the beacon signal and outputs the distance determined signal according to the beacon signal.

In step S113, the central control device obtains the distance determined signal DTS from the switch device and determines the strength of the distance determined signal DTS. The central control device then calculates the distance between the beacon device and the switch device according to the strength. In addition or alternatively, the central control device may calculate other parameters such as the angle of arrival (AoA), the angle of departure (AoD), the time of arrival (ToA), the time of flight (ToF), the transmission time between the time of arrival and the time of flight, according to the distance determined signal DTS, but present disclosure is not limited thereto. The central control device may obtain the spatial information related to the parameters in step S119.

In step S115, when the user speaks, the beacon device such as the cell phone receives the voice of the user and outputs the voice signal according to the voice. The central control device analyzes the content of the voice signal and obtains the spatial information according to the analyzed content. Then, step S119 is performed.

In step S117, the central control device looks up the spatial information from spatial database according to the present time information and the preset switching time information. Then, step S119 is performed.

In step S119, the central control device looks up the spatial information according to the distance between the beacon device and the switch device, the voice signal or the preset switching time information.

In step S121, the central control device determines the position of the beacon device relative to the electronic devices in the space according to the obtained spatial information. The central control device selectively switches the switch devices based on the position of the beacon device.

In step S123, the central control device switches the switch devices to control the electronic devices connected to the switch devices.

In summary, the present disclosure provides the switch controlling system and method of the smart appliances. When the user holds the beacon device in the space, the switch device receives the beacon signal from the beacon device. The beacon signal received by the switch device changes with a movement of the user. The switch device outputs the distance determined signal according to the beacon signal. The central control device obtains the spatial information according to the distance determined signal, and switches the switch devices to precisely control the electronic devices according to the spatial information. Furthermore, the switch controlling system can track the position of the beacon device and accordingly determines the position of the object onto which the beacon device is attached.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A switch controlling system of smart appliances, comprising:
   a beacon device movably located in a space and configured to output a beacon signal;
   a plurality of switch devices disposed respectively at different positions in the space, wherein each of the switch devices is connected to a plurality of electronic devices disposed in the space, the switch device entering within a distance range of the beacon device is wirelessly connected to the beacon device, receives the beacon signal from the beacon device and outputs a distance determination signal according to the beacon signal; and
   a central control device connected to the switch devices, and configured to obtain spatial information of the space to establish a spatial database, look up the spatial information from the spatial database according to the distance determined signal, determine a position of the beacon device relative to the electronic devices in the space according to the spatial information, and selectively switch the switch devices to control the electronic devices based on the position.

2. The switch controlling system according to claim 1, wherein after the beacon device moves from a first region to a second region in the space, the central control device switches the switch device to turn off the electronic device in the first region.

3. The switch controlling system according to claim 1, wherein the central control device is configured to switch each of the switch devices according to present time information and preset switching time information.

4. The switch controlling system according to claim 1, wherein the beacon device is connected to the central control device and transmits a voice signal for instructing the central control device to switch one or more of the plurality of switch devices.

5. The switch controlling system according to claim 1, wherein the central control device is integrated with the switch device.

6. A switch controlling method of smart appliances, comprising the following steps:
   disposing a plurality of switch devices respectively at different positions in a space, and connecting each of the switch devices to a plurality of electronic devices disposed in the space;
   obtaining spatial information of the space to establish a spatial database by a central control device;
   holding a beacon device and movably locating in the space;
   outputting a beacon signal by the beacon device;
   wirelessly connecting the switch device entering within a distance range from the beacon device with the beacon device, receiving the beacon signal from the beacon device by the switch device, and outputting a distance determined signal according to the beacon signal by the switch device; and
   looking up the spatial information from the spatial database based on the distance determined signal, determining a position of the beacon device relative to the electronic devices in the space according to the spatial information, and selectively switching the switch devices based on the position to control the electronic devices, by the central control device.

7. The switch controlling method according to claim 6, further comprising the following step:
- switching the switch device to turn off the electronic device in a first region of the space when determining that the beacon device moves from the first region to a second region in the space, by the central control device.

8. The switch controlling method according to claim 6, further comprising the following step:
- switching each of the switch devices according to present time information and preset switching time information by the central control device.

9. The switch controlling method according to claim 6, further comprising the following step:
- transmitting a voice signal for instructing the central control device to switch one or more of the plurality of switch devices by the beacon device.

* * * * *